United States Patent

[11] 3,611,337

| [72] | Inventors | David J. Balzer<br>East Peoria;<br>Lloyd L. Phelps, Jr., Creve Coeur, both of Ill. |
|---|---|---|
| [21] | Appl. No. | 813,159 |
| [22] | Filed | Apr. 3, 1969 |
| [45] | Patented | Oct. 5, 1971 |
| [73] | Assignee | Caterpillar Tractor Co.<br>Peoria, Ill. |

[54] FILTER CONDITION INDICATOR SYSTEM
7 Claims, 3 Drawing Figs.

[52] U.S. Cl. .......................................... 340/239 F,
55/274
[51] Int. Cl. ............................................. G08b 21/00
[50] Field of Search ............................................. 340/239,
213.1; 55/DIG. 34, 274; 200/78, 83.6

[56] References Cited
UNITED STATES PATENTS
| 2,501,793 | 3/1950 | Sperry ......................... | 340/213.1 X |
| 3,206,572 | 9/1965 | Buehler ....................... | 200/83.6 |

Primary Examiner—John W. Caldwell
Assistant Examiner—Daniel Myer
Attorney—Fryer, Tjensvold, Feix, Phillips & Lempio ABSTRACT: An indicator system suitable for indicating a defective fluid filter providing excess blockage to fluid flow, including an electrical switch assembly responsive to the defective operating condition, an indicator responsive to the switch for providing a warning signal and an electrically responsive lockout mechanism for maintaining the indicator in its warning condition.

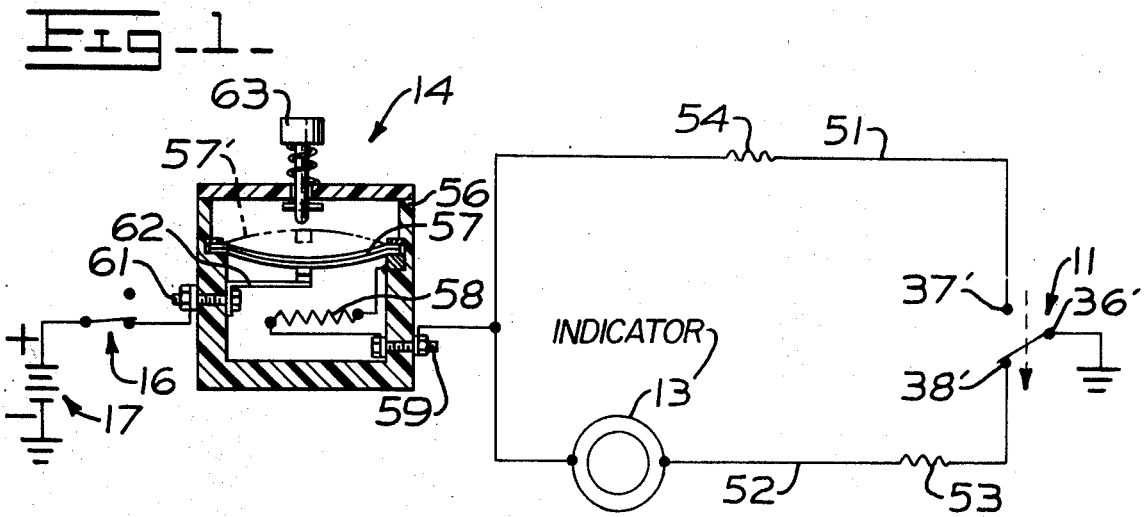
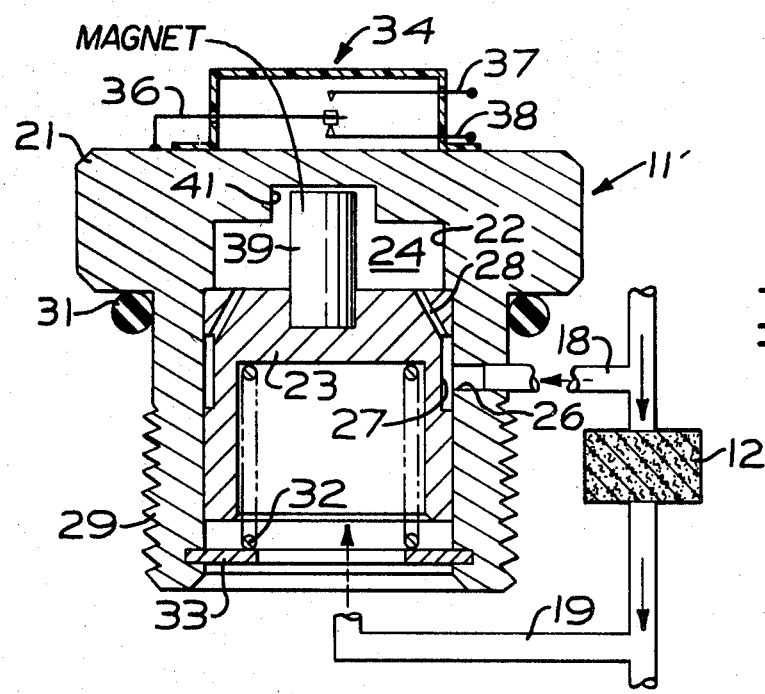
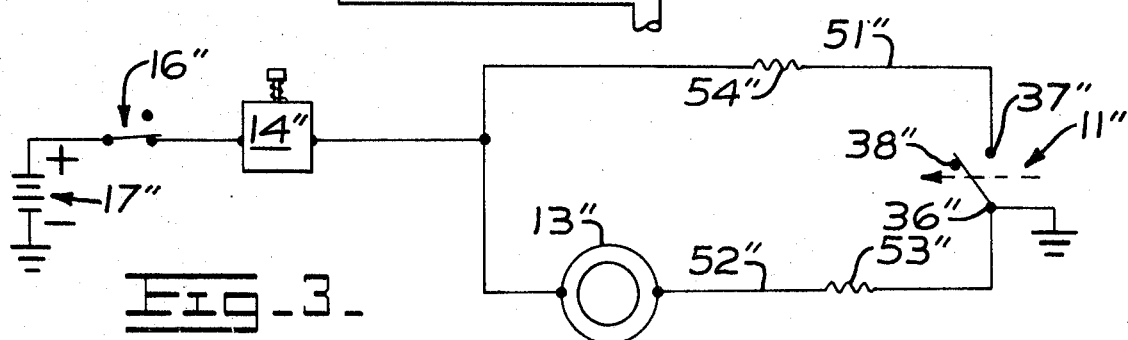

FILTER CONDITION INDICATOR SYSTEM

A preferred embodiment of the present invention, as described below, includes an indicating device similar to that set forth in U.S. Pat. No. 3,364,481, issued Jan. 16, 1968 to J. E. Fuzzell and assigned to the Assignee of the present invention.

The present invention relates to an indicator system including an electrical warning circuit for signaling a defective condition within an operating system. The system is particularly contemplated for use with filter elements associated, for example, with fluid circuits of an engine or other component within a vehicle. As is made apparent from the following description, the present invention may be employed with filter elements disposed within fluid circuits which contain air, cooling fluid such as water, and lubricating or hydraulic fluid, such as oil, for example.

The use of visual indicators, such as signal lights, is well known in the prior art for indicating defective conditions within an operating system such as excessive blockage for a filter element. These indicators are most commonly employed for the engine and other components of a vehicle with electrical power being provided by the vehicle battery. Such an indicator employed, for example, to monitor fluid flow through a filter typically includes a signal light or other visual indicator which is actuated in response to a preselected pressure differential occurring across the filter. However, if the engine is decelerated to idling speed or more importantly, if the engine is stopped, the pressure differential vanishes and the indicator returns to its normal condition, giving no indication of the defective filter. Thus, maintenance personnel in checking or overhauling the vehicle, have no indication of the defective filter without starting the engine and accelerating at least to a high idle speed. Further, the dependency of the indicator system upon the operating speed of the engine may tend to confuse the operator as to the true condition of the filter or other system component. Still further, pressure differentials or other conditions of the type to which these indicators are responsive may also occur intermittently during normal operation even when there is no defective condition within the system. To provide a true indication of the condition of the filter or other component, it is usually desirable that the indicator not be actuated unless there is a continuing defective condition within the operating system.

Accordingly, it is an object of the present invention to provide an indicator system effective for overcoming one or more of the above problems.

It is a particular object of the invention to provide an indicator system wherein the indicator is maintained in its warning condition even when the operating system is shut down, for example, when a vehicular engine is stopped. This is accomplished through the use of a switch assembly responsive to the defective condition, an indicator which is conditioned to provide a warning signal by the switch and lockout means which maintains the indicator in its warning condition even after the defective condition in an operating system is no longer sensed by the switch.

It is a further object of the invention to provide means for preventing the system from being responsive to transient conditions which do not indicate an actual defective condition in the operating system. For example, pressure differentials may momentarily arise within fluid circuits without being caused by blockage of a filter. To accomplish this object, the present invention contemplates a lockout mechanism such as a thermally actuated circuit breaker which is not actuated unless the particular condition is sensed by the switch for at least a preselected period of time.

Additional objects and advantages of the present invention are made apparent in the following description having reference to the accompanying drawing. In the drawing:

FIG. 1 illustrates a warning system with its components being shown partly in section and partly by schematic representation;

FIG. 2 is a sectioned view of a pressure differential switch assembly which may be employed within the warning system of FIG. 1, the switch assembly being shown in association with a fluid filter line; and FIG. 3 is a schematic representation of another embodiment of a warning system similar to that illustrated in FIG. 1.

An indicator system of the type contemplated by the present invention is illustrated in FIG. 1 to include a switch assembly 11 which is responsive to a defective condition within an operating system. The present invention is particularly contemplated for monitoring the condition of a filter within a fluid circuit. To monitor the condition of an air filter, the switch assembly may be a single-pole, double-throw vacuum switch, for example. As noted above, however, the warning system is also employable with filters arranged in fluid circuits containing a liquid such as a lubricating oil. Such a filter is indicated at 12 in FIG. 2 together with a pressure differential switch assembly 11' which is particularly adaptable for monitoring the condition of such a filter and which may be interchanged with the switch assembly 11 in the warning system of FIG. 1. The pressure differential switch assembly 11' illustrated in FIG. 2 is described in greater detail below.

Referring again to FIG. 1, the warning system also includes an indicator or visual signal means as is schematically shown at 13. The indicator 13 is of a type conditioned to provide a warning signal in response to sensing of a defective operating condition by the switch 11. The indicator 13 is particularly contemplated to be a magnetically controlled, rotatable ball indicating device of the type disclosed in detail within the U.S. Pat. No. noted above. However, other types of electrically actuated indicators may be employed. For adaptation to the particular circuit of FIG. 1, the indicator should provide a warning signal upon interruption of an electrical circuit providing current to the indicator.

The warning system of FIG. 1 further includes a lockout device 14 which is effective to maintain the indicator 13 in its warning condition even when a defect in an operating system is no longer sensed by the switch 11. The construction of the lockout 14, its interconnection within the warning system of FIG. 1 and its manner of operation are set forth in detail below. In general, the lockout 14 may be a relay or other conventional circuit breaking device. However, to accomplish more particular objects of the present invention, the lockout device 14 is contemplated as being a thermally actuated trip device as described below.

The warning system of FIG. 1 further includes a circuit disconnect switch 16 and a source of electrical power such as a vehicle battery indicated at 17 which are included in an electrical circuit together with the components described above. The battery 17 and the switch 11 are respectively connected to ground to complete the circuit of FIG. 1.

To describe the components of the warning system in greater detail, the pressure differential switch 11' which is particularly contemplated for use with a liquid filter of the type indicated at 12, is in association with both the inlet and outlet sides of the filter 12 by means of conduits respectively indicated at 18 and 19. A pressure sensitive portion of the switch assembly 11' is formed by a housing 21 defining a cylindrical bore 22. A piston 23 is arranged for reciprocable motion within the bore 22. A generally closed chamber 24 formed at one end of the bore 22 by the piston 23 is in communication with the conduit 18 by means of a passage 26 formed in the housing 21, an annular slot 27 formed in the piston 23 and internal passages such as that indicated at 28 within the piston 23. A portion of the bore 22 on the opposite side of the piston 23 is in communication with the conduit 19.

The housing 21 is threaded as indicated at 29 to permit installation of the switch assembly within an existing oil filter housing with a fluid seal being provided by the seal ring 31.

For a filter element of the type indicated at 12, inlet pressure communicated through conduit 18 to the chamber 24 will usually be somewhat greater than outlet pressure which is communicated through conduit 19 to the opposite side of the piston 23. To maintain the piston 23 in the position shown in FIG. 2, at least during normal operating condition, a spring 32 is arranged for interaction between the piston 23 and a snap ring 33 which is secured to the housing 21. The strength of spring 32 is added to pressure introduced from the conduit 19 to resist downward shifting of the piston 23 by inlet pressure existing within the chamber 24. The strength of the spring 32 is preferably selected so that the piston 23 is not shifted until blockage within the filter 12 creates a differential between its inlet and outlet pressure which is indicative of a defective condition for the operating system with which the filter is associated. Thus, the strength of spring 32 is generally equivalent to the maximum safe-operating pressure differential across the filter 12.

Switch means within the assembly 11' are preferably embodied within a reed switch assembly 34 which is externally secured to one end of the housing 21. The switch 34 includes a magnetically responsive common contact 36. The contact 36 is shown in the drawing as being connected to ground through the electrically conductive housing 21. For purposes which are made apparent below, the housing 21 is nonmagnetic and electrically conductive. The housing may be constructed of a material such as aluminum or stainless steel. The switch 34 also includes a pair of nonmagnetic reed switch elements 37 and 38. The position of the switch element 36 is controlled by a magnet 39 which is disposed within the chamber 24 and secured to the piston 23. The housing bore 22 includes a counterbore indicated at 41 to permit positioning of the magnet 39 in generally close proximity to the switch element 36.

With the piston 23 being positioned as shown in FIG. 2, under generally normal-operating conditions for the filter 12, the magnet 39 attracts the switch element 36 downwardly so that the element 38 is engaged by the contact 36 while the element 37 is separated from the common contact. When the filter 12 provides excess blockage to fluid flow and creates an undesirable differential between the pressures in conduits 18 and 19, pressure within the chamber 24 overcomes pressure on the opposite side of the piston as well as the spring 32 to shift the piston 23 and magnet 29 downwardly as viewed in the drawing. As the magnet shifts downwardly, the switching element 36 returns to its normal position. In that condition, the element 37 is engaged by the common contact 36 while the element 38 is then out of engagement with the common contact.

To illustrate the manner in which the switch assembly 34 may be connected into the circuit of FIG. 1, similar portions of the switch 34 are indicated by primed numerals within FIG. 1.

Referring now to FIG. 1 as well, the contacts 37' and 38' of the switch assembly 11 are respectively connected with the lockout mechanism 14 by parallel electrical paths indicated at 51 and 52. The indicator 13 is included along with the contact 38' in the parallel path 52 together with a current-limiting resistor indicated at 53. Another resistor 54 is also connected within the other parallel path 51.

The lockout device 14 as illustrated in FIG. 1 is of a type particularly contemplated for preventing the indicator 13 from giving a false signal, for example, during transient pressure differentials arising across the filter 12 of FIG. 2 which are not caused by blockage within the filter. To accomplish this purpose, the lockout device 14 includes a housing 56 which supports a stressed, bimetallic member indicated at 57. An electrical heating element or coil 58 is electrically connected to the bimetallic member 57 and to both of the parallel paths 51, 52 through an electrically conductive bolt 59 which penetrates the housing 56. Another electrically conductive bolt 61 also penetrates the housing 56 and conductively supports a contact 62 which is engaged by the bimetallic member 57 when the member 57 is in its downwardmost position as shown in the drawing. The conductive bolt 61 is connected in electrical series with the switch 16 and the grounded battery 17 to complete the circuit for the components illustrated in FIG. 1.

In normal operation of the warning system illustrated in FIG. 1 and partially illustrated in FIG. 2, the switch assembly 11 is connected into the circuit through the contact 38' during normal operating conditions, for example, when there is no substantial blockage within the filter 12 of FIG. 2. Thus, the circuit is formed through the resistor 53, indicator 13 and lockout device 14 with the battery 17 at least when the switch 16 is closed. Ohmic characteristics of the resistor 53 and indicator 13 are selected so that current flow through the heating element 58 is insufficient to affect the bimetallic member 57. Thus, during normal operating conditions, the indicator 13 continues to provide a safe-operating signal, for example, with respect to the filter 12 in FIG. 2.

When a defective condition arises such as an undesirably large pressure differential across the filter 12, the switch assembly 11 senses that condition, for example, by shifting of the piston 23 and magnet 39 as illustrated in FIG. 2. When this occurs, the switch assembly 11 or 11' is shifted to another operating position where the common contact 36' comes into engagement with the switch element 37' and is separated from the switch element 38'. This immediately interrupts the circuit for the indicator 13 and conditions the indicator 13 to provide a warning signal indicative of the defective condition. In addition, the ohmic ratings for the resistor 54 are selected so that current flow through the heating element 58 is increased sufficiently to affect the bimetallic member 57. When the bimetallic member 57 is sufficiently heated by the element 58, it is shifted upwardly to a broken line position indicated at 57' so that the circuit is interrupted between the heating element 58 and the contact member 62.

The bimetallic member 57 tends to remain in its upwardly flexed position 57' until its temperature is reduced and it is reset in its normal-operating position indicated at 57, for example, by a spring-loaded pushbutton indicated at 63. Accordingly, the lockout device 14 prevents the indicator 13 from again being electrically energized even though the pressure differential should disappear across the filter 12 with the common switch contact 36' being again engaged with the switch element 38'. Thus, the indicator 13 continues to signal the defective condition even when fluid flow across the filter 12 is substantially reduced and even if a system including the filter 12 is completely shut down.

An alternate embodiment of the warning system is illustrated in FIG. 3 with similar components being indicated by double primed numerals. The major distinction in this embodiment as compared to that of FIG. 1 lies in connection of the parallel electrical path 52" with the common switch contact 36" rather than the switch element 38". With this arrangement, the indicator 13" is similarly energized during normal operating conditions and, in addition, continues to be energized for at least an interval of time after a defective operating condition is sensed by the switch assembly 11". At that time, the common contact 36" again engages the switch element 37'. However, in the circuit of FIG. 3, this serves to connect the switch 11" with the lockout device 14" through both of the parallel electrical paths 51" and 52". Because of this change in operation, the ohmic characteristics of the resistors 53", 54" and the indicator 13" may be somewhat different. However, they continue to prevent actuation of the lockout device 14" during normal-operating conditions. Also, when the switch 11" responds to a defective operating condition, current flow through the lockout device 14" and through both of the parallel paths 51", 52" is sufficient to actuate the lockout device 14" so that the circuit is disrupted and the indicator 13" is maintained in a condition where it provides a warning signal.

What is claimed is:

1. An indicator system suitable for indicating a defective fluid filter providing excessive blockage of fluid flow, comprising a switch assembly capable of sensing a defective operating condition, the switch assembly having a normal operating position and being capable of shifting to another operating position upon sensing the faulty condition;

an electrically responsive indicator responsive to electrical current flow for providing a safe operating signal and otherwise providing a warning signal in the absence of current flow;

an electrically responsive lockout device comprising a thermal trip device including a heating element coupled in electric series circuit relation with the switch assembly and indicator and a stressed bimetallic member tending to remain in either an electrically closed position completing the circuit for the heating element, switch assembly and indicator or an electrically open position, thermal energy from the heating element causing the bimetallic member to assume its electrically open position;

means for selectively returning the bimetallic member to its electrically closed position; and an electrical source for powering the circuit.

2. The invention of claim 1 wherein the circuit breaker is associated with the switch by parallel electrical paths, one path including the indicator, the other path providing a closed circuit with the switch effective to operate the circuit breaker when the switch is in its other operating position.

3. An indicator system suitable for indicating a defective fluid filter providing excessive blockage to fluid flow, comprising a switch assembly capable of sensing a defective operating condition, the switch assembly having a normal operating position and being capable of shifting to another operating position while sensing the faulty condition, an electrically responsive indicator associated with the switch, the indicator being conditioned to provide a warning signal in response to the switch being placed in its other operating position, an electrically responsive lockout device associated with the indicator and switch, the lockout device being effective to maintain the indicator in its condition providing a warning signal upon shifting of the switch to its other operating position. and 4. The invention of claim 1 wherein the switch assembly includes pressure-sensitive means arranged in communication with a fluid filter line and switch means responsive to the pressure sensitive means.

5. The invention of claim 1 wherein the switch assembly includes a differential pressure-sensitive piston in a bore formed by a housing, portions of the housing being in respective communication with an inlet conduit and an outlet conduit for a fluid filter.

6. The invention of claim 5 further comprising a magnet supported by the piston, magnetically responsive switch means arranged outside of the housing for operation by the magnet, the housing being nonmagnetic.

7. The invention of claim 5 further comprising a spring arranged to resist movement of the piston by fluid pressure from the inlet conduit, strength of the spring being generally equivalent to a maximum safe operating pressure differential across the filter.

UNITED STATES PATENT OFFICE
CERTIFICATE OF CORRECTION

Patent No. 3,611,337  Dated  October 5, 1971

Inventor(s) David J. Balzer and Lloyd L. Phelps

It is certified that error appears in the above-identified patent and that said Letters Patent are hereby corrected as shown below:

Column 6, line 8, add -- an electrical source for powering the circuit, the lockout device being a thermal trip device normally providing a circuit path for the indicator, the device being operatively responsive to the switch being placed in its other operating position, the thermal trip device including a heating element energized by the switch being placed in its other operation position and a heat responsive contact element normally providing a closed electrical circuit path with the indicator, the contact element being responsive to energizing of the heating element by opening the electrical circuit path with the indicator, the thermal trip device being associated with the switch by parallel electrical paths, one path including the indicator, the other path providing a closed circuit with the switch when the switch is in its other operating position, resistance characteristics of the two parallel paths permitting operation of the thermal trip device only after the switch is maintained in its other operation position for a preselected time duration.

Signed and sealed this 25th day of April 1972.

(SEAL)
Attest:

EDWARD M. FLETCHER, JR.
Attesting Officer

ROBERT GOTTSCHALK
Commissioner of Patents